(12) United States Patent
Kolev

(10) Patent No.: US 6,347,129 B1
(45) Date of Patent: Feb. 12, 2002

(54) CONTAINER FOR THE COLLECTION AND SPREADING OF CORE MELT AND A NUCLEAR POWER PLANT WITH SUCH A CONTAINER

(75) Inventor: Nikolay Kolev, Herzogenaurach (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/327,009

(22) Filed: Jun. 7, 1999

Related U.S. Application Data

(63) Continuation of application No. PCT/EP96/05450, filed on Dec. 5, 1996.

(51) Int. Cl.[7] .............................................. G21C 9/016

(52) U.S. Cl. ....................................................... 376/280

(58) Field of Search ........................................... 376/280

(56) References Cited

U.S. PATENT DOCUMENTS

| | | | | |
|---|---|---|---|---|
| 4,116,764 A | * | 9/1978 | Jones | 176/38 |
| 4,442,065 A | * | 4/1984 | Latter et al. | 376/280 |
| 4,464,333 A | * | 8/1984 | Wohlsen | 376/280 |
| 4,978,496 A | * | 12/1990 | Dumas et al. | 376/280 |
| 5,186,888 A | * | 2/1993 | Malaval | 376/280 |
| 5,263,066 A | * | 11/1993 | Szabo et al. | 376/280 |
| 5,280,509 A | * | 1/1994 | Py et al. | 376/280 |
| 5,307,390 A | * | 4/1994 | Gou et al. | 376/280 |
| 5,343,506 A | * | 8/1994 | Artnik et al. | 376/280 |
| 5,349,615 A | * | 9/1994 | Ferroni | 376/280 |
| 5,659,589 A | * | 8/1997 | Wistuba et al. | 376/280 |
| 5,867,548 A | * | 2/1999 | Bitterman et al. | 376/280 |
| 5,889,830 A | * | 3/1999 | Hollmann | 376/280 |
| H91 H | * | 7/1986 | Gabor et al. | 376/280 |

FOREIGN PATENT DOCUMENTS

| | | | | |
|---|---|---|---|---|
| CH | 627869 | | 1/1982 | |
| DE | 2840086 C2 | | 9/1981 | |
| DE | 4306864 | * | 3/1993 | ........... G21C/9/016 |
| DE | 004237245 | * | 5/1993 | ........... G21C/9/016 |
| DE | 4211030 A1 | | 10/1993 | |
| DE | 4322107 A1 | | 1/1995 | |
| EP | 0514243 A1 | | 11/1992 | |
| EP | 0587959 A1 | | 3/1994 | |
| FR | 2341181 | * | 1/1977 | ............ G21C/9/00 |
| FR | 2341181 | | 9/1977 | |
| GB | 2052133 A | * | 1/1981 | ............ G21C/9/00 |
| JP | 0155388 | * | 12/1979 | ........... G21C/15/06 |
| WO | WO 94/29876 | | 12/1994 | |

* cited by examiner

Primary Examiner—Michael J. Carone
Assistant Examiner—John Richardson
(74) Attorney, Agent, or Firm—Herbert L. Lerner; Laurence A. Greenberg; Werner H. Stemer

(57) ABSTRACT

The container collects and spreads core melt in a nuclear power plant. The container has a structured bottom, particularly a cartridge-like bottom. The bottom has a material of good thermal conductivity, a plurality of geodetically highest points and a plurality of geodetically lowest points (5) and an outer wall. The outer wall extends with an upward slope between a geodetically lowest point and an adjacent geodetically highest point. A steam conduit which runs through the container interior is provided at each geodetically highest point. The container allows external cooling of core melt. As a result, the formation of radioactive aerosols, the occurrence of a steam explosion and the formation of hydrogen are avoided. In addition, the cooling is made particularly effective by the upward slope of the outer wall since the formation of a spatially fixed steam region, which is associated with a decrease in thermal conductivity, is prevented. The invention furthermore relates to a nuclear power plant with a container for the collection and spreading of core melt.

23 Claims, 3 Drawing Sheets

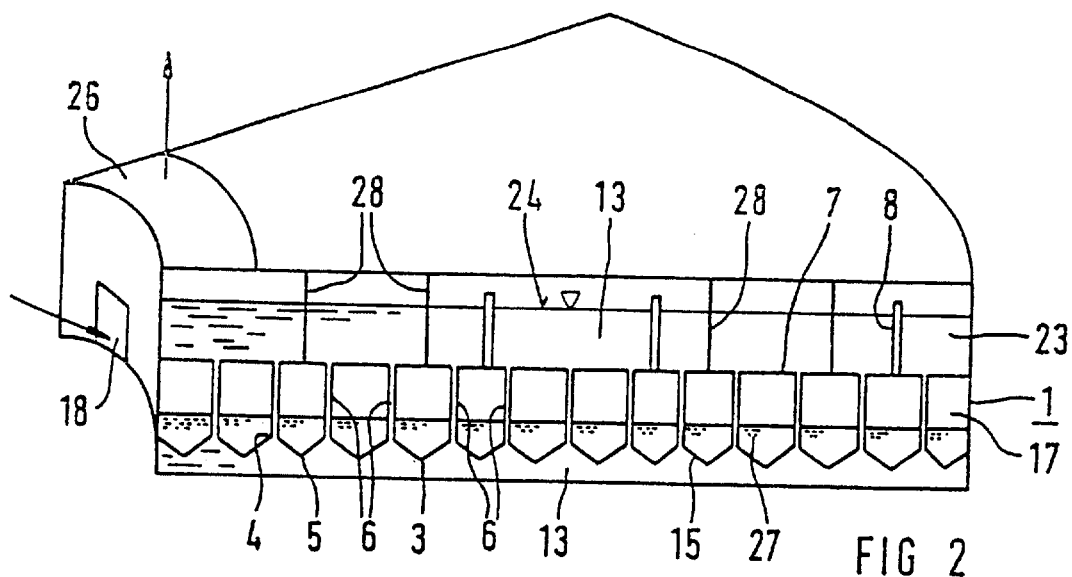
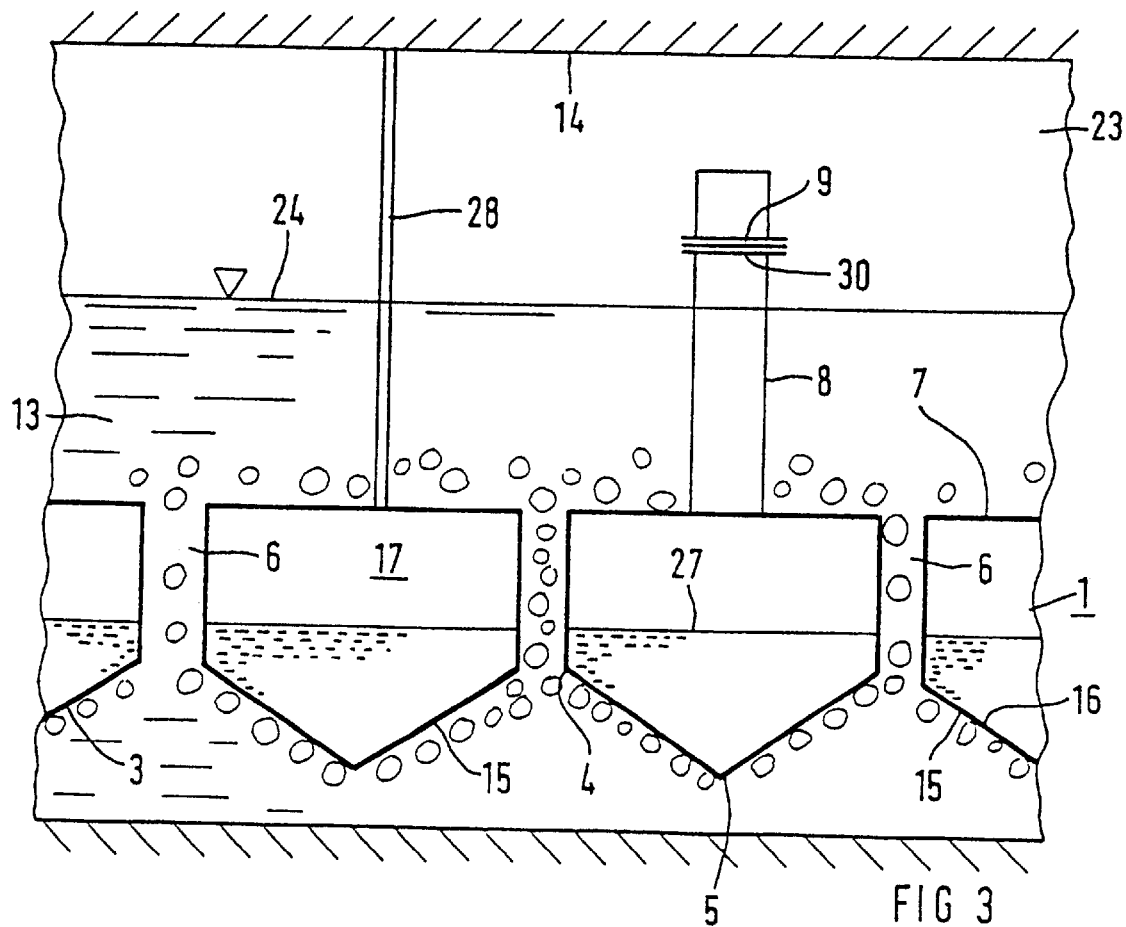

CONTAINER FOR THE COLLECTION AND SPREADING OF CORE MELT AND A NUCLEAR POWER PLANT WITH SUCH A CONTAINER

This application is a continuation of PCT/EP96/05450 filed Dec. 5, 1996.

BACKGROUND OF THE INVENTION

FIELD OF THE INVENTION

The invention lies in the field of nuclear power generation technology. More specifically, the invention relates to a container for collecting and spreading core melt in a nuclear power plant with a wall part and a bottom. The invention further pertains to a nuclear power plant with a reactor pressure vessel which is disposed in a reactor cavity and contains a reactor core, and with a container for the collection and spreading of core melt.

The design of nuclear power plants, especially light-water nuclear reactors, must provide safety provisions for the control of extremely unlikely accidents in which the reactor core melts down. This is accomplished, for example, by providing a space immediately underneath or below and laterally adjacent of the reactor pressure vessel in which core melt formed by a melting reactor core can be collected and cooled. It is important, thereby, to avoid pollution of the surroundings. The effects of an unlikely accident of this kind thus remain confined to the nuclear power plant. In the case of a lateral disposition, the collecting space is of large-area design, as described, for example, in the international PCT publication WO 94/29876. That core catcher allows the core melt to spread out thinly over a large area, thereby forming a large surface area which can be cooled in an effective manner. A passage leads underneath the reactor pressure vessel from the reactor cavity in which the reactor pressure vessel is accommodated to the spreading space. The passage is closed during normal operation of the nuclear power plant. The spreading space and the reactor cavity are free from water during normal operation. The possibility of a steam explosion is thus reliably avoided in the event of the emergence of core melt. Only when the core melt enters the spreading space is water introduced passively into the spreading space. Steam which forms during this process can be discharged from the spreading space over a large area. In all cases, it is ensured that uncontrolled steam formation in the reactor cavity does not occur.

German published patent application DE 43 22 107 A1 has disclosed a structure for collecting and cooling core melt, in which a coolant flows through cooling passages which are arranged in the bottom of a core melt spreading chamber. As a result, only the bottom is cooled.

SUMMARY OF THE INVENTION

It is accordingly an object of the invention to provide a collecting container for core melt in a nuclear power plant, which overcomes the above-mentioned disadvantages of the heretofore-known devices and methods of this general type and which ensures even more effective and passive cooling of the core melt with at most little and controlled formation of steam. It is a further object of the invention to provide a nuclear power plant with a collecting container for core melt in which the formation of steam and hydrogen in the event of the emergence of core melt is largely prevented.

With the foregoing and other objects in view there is provided, in accordance with the invention, a container for collecting and spreading core melt in a nuclear power plant, comprising:

a structured bottom
  formed of a material of good thermal conductivity; and
  formed with a plurality of geodetically lowest points and a plurality of geodetically highest points;
an outer wall extending with an upward slope between a respective one of the geodetically lowest points and a respectively adjacent one of the geodetically highest points; and
a steam conduit extending through an interior of the container and at each of the geodetically highest points.

In accordance with an added feature of the invention, the bottom has an inner wall extending with an upward slope between a respective one of the geodetically lowest points and a respectively adjacent one of the geodetically highest points.

The term "geodetically highest points" as used herein is to be understood as describing the local maxima of the bottom, or floor. They can lie in one-plane or at different geodesic heights. The geodetically lowest points are local minima of the bottom and can lie in one plane or at geodetically different levels. An upward slope of the outer wall of the bottom between a geodetically highest point and an adjacent geodetically lowest point means that a horizontal profile between these two points, i.e. a profile at a constant geodesic level, is largely excluded. This has the advantage that cooling liquid in contact with the outside of the rising or falling bottom rises along the bottom due to heating, and steam bubbles which form in it can be discharged via the steam conduit. These are designed such that a two-phase mixture (steam/cooling liquid) can flow through in a sufficient quantity even in a transient flow phase. They are composed, for example, of a thermally insulating material or are surrounded by such a material. The upward slope is an effective means of preventing the formation of a steam-bubble region on the outside of the bottom, leading to impairment of heat transfer out of the container to the cooling liquid. It is particularly advantageous that the core melt flowing into the container does not come into direct contact with a cooling liquid, thus reliably preventing the uncontrolled formation of steam and a steam explosion. All that occurs is heat transfer between the core melt and a cooling liquid surrounding the bottom or a cooling device connected to the container. By avoiding direct contact with metal which may flow into the container after the core melt, a hydrogen-forming reaction between a cooling liquid, especially water, and this metal is additionally avoided. The bottom preferably extends between a geodetically lowest point and an adjacent geodetically highest point with a strictly monotonic slope, it being possible for the slope between a geodetically lowest point and a geodetically highest point to be constant. This makes the bottom particularly simple to produce from the point of view of manufacturing technology. The bottom preferably has a wall thickness of 1 cm to 10 cm, in particular 5 cm, this wall thickness being used for preference in particular in the case of a bottom where the thermally conductive material is a steel. Since the bottom comes into direct contact with the core melt, the thermal conductivity of the material for the bottom should be chosen in such a way that a crust forms as rapidly as possible in the region of the bottom. The thermal conductivity of a steel is so high that solidification of the core melt in the immediate vicinity of the bottom can be achieved within a few minutes. The container is preferably closed by a top made of a material of good thermal conductivity. Although the top does not come into direct contact with the core melt when core melt enters the container, a high thermal load is imposed on the top due to heat radiation. The top is therefore preferably to be designed in such a way that the heat given off by heat radiation can be rapidly dissipated. The top can be connected to a separate cooling system or, in particular, can be connected by way of the steam conduits to a cooling liquid surrounding the bottom.

In accordance with an added feature of the invention, a plurality of conduits pass through the top and a differential-pressure-dependent shut-off element closes the conduits for a fluid flow. This avoids the formation of excess pressure in the container. The shut-off element can, for example, be a one-way bursting disc. The bursting disc is preferably triggered only at a differential pressure at which the pressure within the container is higher than outside the container. For this purpose, the bursting disc is, for example, supported in the direction of the container by a metallic undernet. The conduits which pass through the top are taken to a geodesic level such that they project beyond the level of a cooling liquid serving to cool the top.

In accordance with an additional feature of the invention, the bottom is formed in a dome shape or a pyramid shape around a respective geodetically highest point. In other words, the bottom is formed with singular geodetically highest points, which represent the tips of respective pyramids, cones or half-shells (domes). The domes or pyramids (cones) have a circular or rectangular cross-section. It will be understood that other cross-sectional shapes, for example triangular or oval, are likewise possible.

In this case, the bottom of the container has a grid-like structure, the geodetically lowest points lying on grid lines and essentially singular geodetically highest points being arranged in the triangles quadri-laterals formed by the grid lines. It is a particularly simple matter to connect a respective steam conduit at the singular geodetically highest points. The geodetically highest points and the geodetically lowest points can likewise be arranged on non-intersecting lines, the bottom thus being structured with non-intersecting, essentially parallel furrows. It is also possible for the intersecting grid lines to be formed by the geodetically lowest points.

In accordance with another feature of the invention, the bottom has a wall with a thickness of between 1 cm and 10 cm. In a preferred embodiment, the bottom material with the good thermal conductivity is metal.

With the above and other objects in view there is also provided, in accordance with the invention, a nuclear power plant of the type having a reactor pressure vessel disposed in a reactor cavity and enclosing a reactor core, with a container for collecting and spreading core melt escaping from the reactor cavity upon a meltdown accident. The container comprises a wall part and a bottom part contiguous with the wall part, the bottom part:

being formed of a material of good thermal conductivity;

being formed with a plurality of geodetically lowest points and a plurality of geodetically highest points; and including an outer wall extending with an upward slope between a respective one of the geodetically lowest points and a respectively adjacent one of the geodetically highest points, and being selectively surrounded by a cooling liquid;

a steam conduit extending through an interior of the container and at each of the geodetically highest points.

A nuclear power plant of this kind with a container for the collection and spreading of core melt, the bottom of which slopes upwards and downwards alternately and can be cooled externally by means of a coolant ensures that the core melt which has been collected and retained on the bottom in the container is cooled effectively without the formation of a steam film of poor thermal conductivity on the outer wall of A the bottom. The avoidance of such a steam film ensures effective cooling and reliable enclosure of the core melt. In particular, because of the good thermal conductivity of the bottom, rapid formation of a crust on the melt occurs in the region of the bottom. Any steam which does form on the outer wall is removed in an effective manner by way of the steam conduits, for which purpose these are in each case provided at a geodetically highest point of the bottom, to which the steam which forms rises. The bottom is preferably made from a metal, in particular a steel. The wall part of the container can likewise be made of-a material of good thermal conductivity, a metal. However, it can also be integrated into a supporting structure of the nuclear power plant, in particular a concrete structure. As an alternative, the steam conduit can be produced from a thermally conductive or thermally insulating material. By means of external cooling of the container without direct contact between the core melt and cooling liquid, both a steam explosion and the formation of hydrogen, in particular by the molten metal from the nuclear power plant carried along in the core melt, is reliably avoided. The formation of radioactive aerosols at the surface of the core melt by the avoidance of direct contact with the cooling liquid is also significantly reduced. If aerosols are formed, their spread is furthermore restricted to a small spatial area. In particular, no aerosols are released to the surroundings of the nuclear power plant.

The container is preferably closed by a top made of a thermally conductive material which is capable of absorbing the thermal radiant power released by a core melt and of releasing it to a cooling system or directly to a cooling liquid. This ensures that both sufficient thermal energy is dissipated via the bottom, which is in direct contact with the core melt, and that the heat released from the melt by thermal radiation is absorbed quickly at the top.

In accordance with a further feature of the invention, in case of an accident involving a reactor core meltdown, the container is completely surrounded by a cooling liquid In a further embodiment, the container is also completely surrounded by the coolant during a normal operation of the nuclear power plant. In the preferred embodiment, the container is completely surrounded by the cooling liquid, possibly even during normal operation of the nuclear power plant or it may be supplied by flooding when there is an accident involving a reactor core meltdown. In both cases, it is ensured with certainty that when the core melt enters the container in the case of an accident involving a reactor core meltdown, the container is completely surrounded by a cooling liquid for the purpose of cooling.

In accordance with again another feature of the invention, there is provided a supporting structure supporting the container. The container is fixed to the supporting structure so as to allow a relative movement thereof upon a change in temperature. Depending on the dimensioning and choice of materials, the container can be fixed to a supporting structure of the nuclear power plant from above, in particular suspended from it, or be supported or anchored from below. The container is preferably fixed in such away that it can move with changes in temperature, thereby reducing the occurrence of thermal stresses when the core melt flows in. The container is preferably connected at a point geodetically below the reactor pressure vessel to an opening of the reactor cavity, for example by means of a passage, a chute or similar means.

In accordance with a concomitant feature of the invention, the container has a horizontal cross-sectional area of between 100 m² and 200 m², in particular 170 m². This leads to effective spreading of the core melt over a large area. By virtue of the rising and falling profile of the bottom of the container, the surface area of the bottom which is actually available for cooling by direct contact with the core melt is significantly larger than the horizontal cross-sectional area of the bottom. It is thus possible to determine the cooling performance of the container and the spreading of the core melt in accordance with requirements by the choice of the structuring of the bottom.

Other features which are considered as characteristic for the invention are set forth in the appended claims.

Although the invention is illustrated and described herein as embodied in container for the collection and spreading of core melt and a nuclear power plant with such a container, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 2 is a three-dimensional representation of a container for the collection of the core melt, on an enlarged scale;

FIG. 3 is a detail of FIG. 2 in a longitudinal section on a further enlarged scale.

DESCRIPTION OF THE PREFERRED EMBODIMENTS

Figure 1:
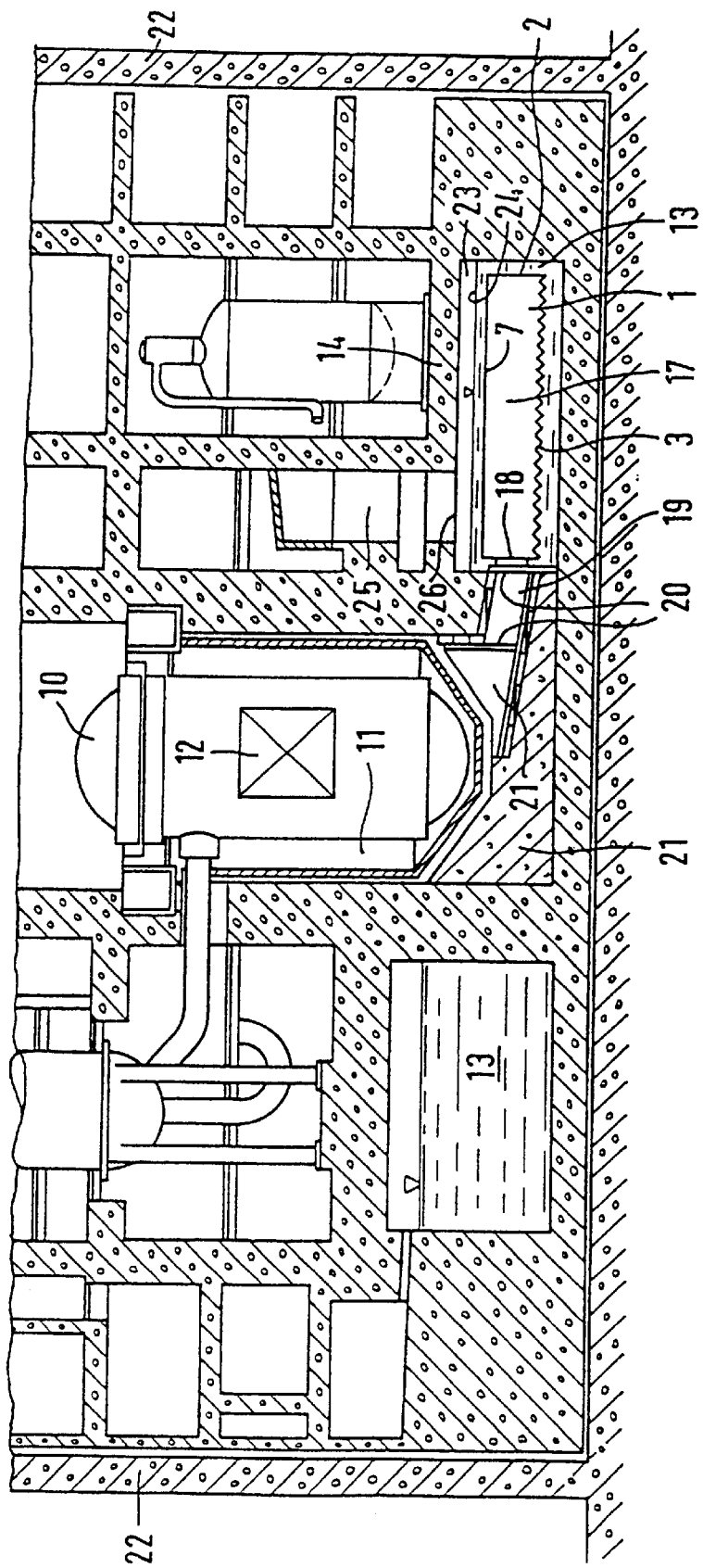
FIG. 1 is a schematic longitudinal section through a nuclear power plant.

Referring now to the figures of the drawing in detail and first, particularly, to FIG. 1 thereof, there is seen a schematic view of a longitudinal section through a nuclear power plant. A reactor pressure vessel 10 is disposed in a reactor cavity 11 in a containment 22. The reactor pressure vessel 10 contains the reactor core 12. Filling bodies 21 are arranged geodetically below the reactor pressure vessel in the reactor cavity 11. The filling bodies reduce the free volume of the reactor cavity 11 underneath the reactor pressure vessel 10. Geodetically below and to the side of the reactor pressure vessel 10, the reactor cavity 11 is formed with a passage opening which opens into a collecting space 23 for core melt 27. The passage opening 19 is closed water-tightly at both ends during normal operation of the nuclear power plant by a respective closure element 20. A filling body 21 is arranged in the reactor cavity 11 in front of the associated closure element 20. The filling body 21 melts upon contact with a core melt 27 and opens the way to the closure element 20, which likewise fails upon contact with the core melt 27 and opens the passage opening 19. A container 1 for the collection and spreading of the core melt 27 is arranged in the collecting space 23. The container communicates fluidically directly with the passage opening 19. The container 1 s formed with an inlet opening 18 leading into the container interior 17, a wall part 2, a bottom 3 and a top 7. The bottom 3 and the top 7 are produced from a material of good thermal conductivity, especially a steel. As seen in longitudinal section, the bottom 3 has a zigzag profile. Even during normal operation of the nuclear power plant, the collecting space 23 is filled up to a level 24 with cooling liquid 13. The level 24 lies geodetically above the top 7. It is also possible for the collecting space 23 to be filled with cooling liquid 13 after the emergence of core melt from the reactor pressure vessel 10 and before the core melt 27 arrives in the container 1.

In either case, the container 1 is completely surrounded by the cooling liquid 13 before the arrival of the core melt 27. Condensate which forms during normal operation or during a malfunction in the operation of the nuclear power plant can thus be passed into the collecting space 23 without danger. The collecting space 23 is formed by a supporting structure 14, in particular one made of concrete, which also serves to fix the container 1. The collecting container 23 has an outlet opening 26 which leads to a steam vent passage 25.

Identical or functionally identical components are identified below with the same reference numerals as used in FIG. 1.

Referring now to FIG. 2, there is shown the collecting space 23 of FIG. 1 in a three-dimensional representation, i.e., a perspective and elevational view, and on an enlarged scale. The collecting space 23 and the container 1 each have a cross-sectional area which can correspond to an annular segment. In the direction of the reactor cavity 11, the container 1 has an inlet opening 18 which is connected to the passage opening 19 of the reactor cavity 11. Through this inlet opening 18, core melt 27 can enter the container. The container 1 has a bottom 3 which has a plurality of geodetically highest points 4 and a plurality of geodetically lowest points 5. The geodetically highest points 4 and the geodetically lowest points 5 are each arranged in a corresponding plane. The outer wall 15 and the inner wall 16 of the bottom 3 each slope at a constant angle to the jag geodetically highest points. Connected to the geodetically highest points 4 there is in each case a steam conduit 6 which runs vertically through the container interior 17 mad opens at the top 7 into the collecting space 23. This provides a connection between the cooling liquid 13, in particular cooling water, which is geodetically below the bottom 3 and that which is geodetically above the top 7. The container 1 is connected to the supporting structure 14 of the nuclear power plant by a plurality of fixing elements 28. These fixing elements 28 are each fixed to the top 7, allowing the container 1 to move in the collecting space 23 with changes in temperature. Vertically extending conduits 8 are likewise fixed to the top 7, these conduits connecting the container interior 17 to a region of the collecting space 23 above the level 24 of the cooling liquid 13. A pressure equalization is thereby provided, if necessary, between the container interior 17 and the collecting space 23 and the interior of the containment 22.

Referring now to FIG. 3, there is shown a fragmentary view of the container 1 on a further enlarged scale. The core melt 27 is collected in the bottom 3 of the cartridge-type or cassette-type structure. The core melt 27 is thus disposed between the geodetically highest points 4 and the geodetically lowest points 5. The container 1 is completely surrounded by the cooling liquid 13 and, as schematically illustrated, steam bubble formation takes place at the outer wall 15 of the container 1 owing to the heat given off by the core melt 27. The upward slope of the outer wall 15 causes the steam bubbles and the cooling liquid 13 to flow by natural convection through the vertical steam conduits 6. The formation of a steam film, which greatly impairs effective cooling, is avoided by virtue of the fact that the outer wall 15 slopes upwards at all times and has no substantial horizontal extent. Effective cooling of the core melt 27 with rapid solidification is thus achieved. Subsequent outflows of melt are therefore unproblematic. In addition, any crack which may occur in the bottom due to thermal stresses will be sealed by the rapid formation of a crust on the core melt. Pressure conduits 8 are connected to the top 7 of the container 1. These pressure conduits 8 are closed by means of a respective shut-off element 9, especially a bursting disc. On the side facing the top 7, the bursting disc 9 has a reinforcement 30, in particular a metallic undernet. This ensures that, in the presence of an excess pressure in the container, the bursting disc 9 fails and hence the pressure conduit 8 is opened and pressure relief of the container 1 thus occurs. This will occur if the pressure relief provided by the passage opening 19 when the closure elements 20 have melted is not sufficient. If the increase in the pressure in the collecting space 23 is brief, however, the bursting disc 9 remains intact, thereby reliably avoiding unwanted outflow of radioactive aerosols and other fission products. To provide additional retention for radioactive aerosols and other fission products, the pressure conduit 8 can be passed through the cooling liquid 13 in a U-shape.

Figure 4:
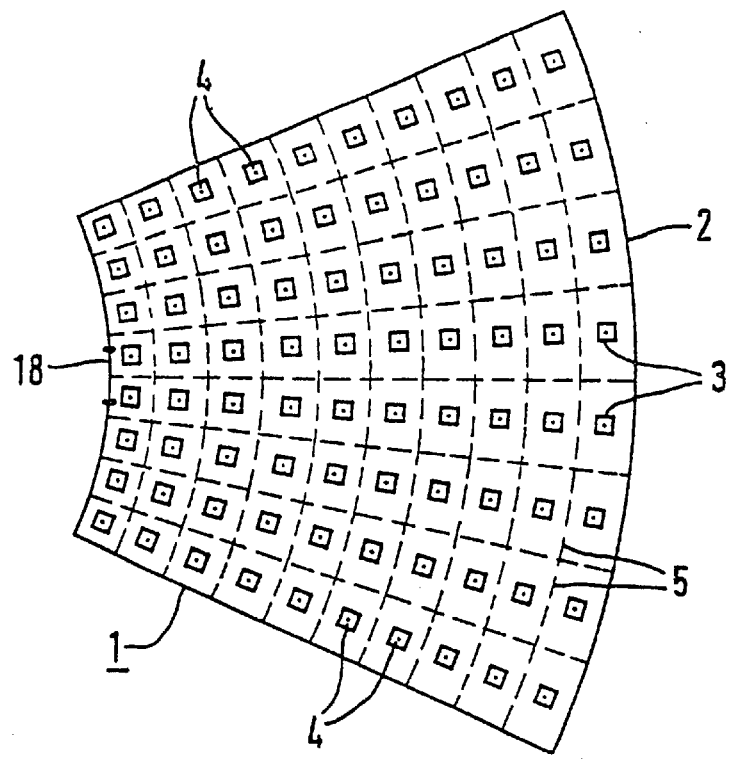
FIG. 4 is a first cross-sectional view through the bottom of the container.
Figure 5:
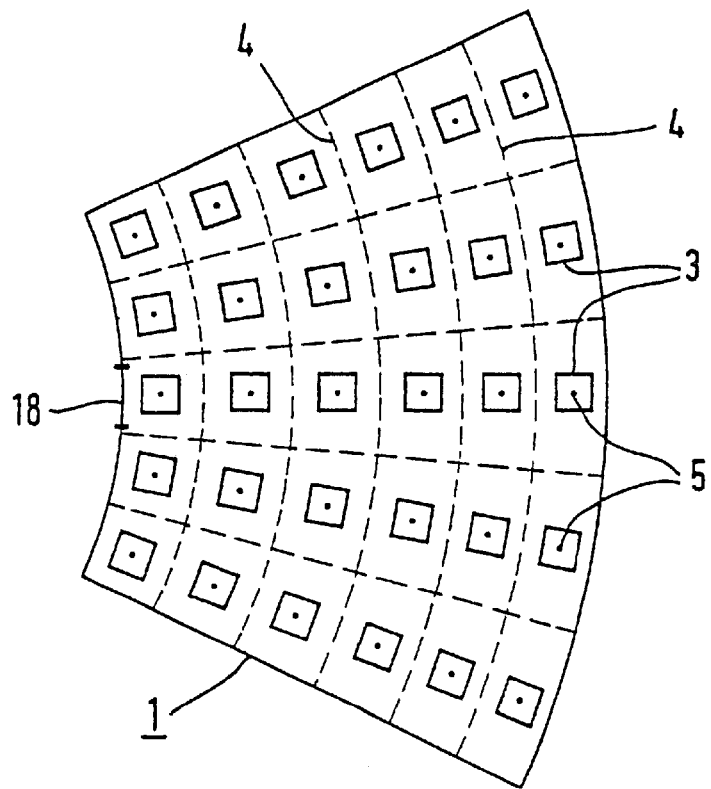
FIG. 5 is a second cross-sectional view through the bottom of the container.

Referring now to FIGS. 4 and 5, there is shown the cross-sectional area of a container 1 in the form of an annular segment. FIG. 4 shows a structured bottom 3 in which there are pyramid-shaped raised portions, a geodetically highest point 4 lying at the tip of each pyramid. The pyramids have an essentially tetragonal cross-section, so that the geodetically lowest points 5 (shown in broken lines) lie on intersecting grid lines. A steam conduit 6 made of a material of poor thermal conductivity is arranged at the singular geodetically highest point 4. FIG. 5 shows an inverse structure of the bottom 3 to that in FIG. 4. Here, the geodetically lowest points 5 are singularly distributed and lie at the tip of an upside-down pyramid. The geodetically highest points 4 accordingly lie on the intersecting grid lines illustrated in broken lines. It will be understood that the "pyramids" can also have a variety of other cross-sections, for example a round, oval or triangular cross-section.

The invention described herein is thus distinguished by a container for the collection and spreading of core melt which has a structured bottom with an outer wall that rises and falls alternately. In particular, the outer wall extends in the form of pyramids or cones, at the tips of which a vertical steam conduit passes through the container. The floor comprises a material of good thermal conductivity, with the result that the core melt collected in the interspaces in the bottom which are formed by the pyramids or cones releases heat easily to the outer wall. A cooling liquid, which dissipates the heat upwards from the outer wall by natural convection, is in contact with the outer wall. Formation of a spatially fixed steam film is prevented in an effective manner by the upward slope of the outer wall. This steam film would have poor thermal conductivity and would hinder the dissipation of the thermal energy of the core melt. Direct contact between the melt and the cooling liquid is avoided by the cooling of the core melt at the outer wall of the container. This ensures that there is no possibility either that a steam explosion will occur during the cooling of the core melt or that hydrogen will be produced by a metal carried along in the core melt. In addition, the formation of radioactive aerosol products at the surface of the core melt is largely avoided and discharge of such aerosol products from the container is limited. Discharge of aerosol products into the environment of the nuclear power plant is thus likewise reduced in an effective manner, if not completely prevented.

I claim:

1. A container for collecting and spreading core melt in a nuclear power plant, comprising:
    a structured bottom wall formed of a material of good thermal conductivity with a plurality of geodetically lowest points,
    a plurality of geodetically highest points and substantially no horizontal segments between a respective one of said geodetically lowest points and a respectively adjacent one of said geodetically highest points, said structured bottom wall being surrounded by and in thermal contact with a cooling liquid, said structured bottom wall extending with an upward slope between a respective one of said geodetically lowest points and a respectively adjacent one of said geodetically highest points such that a rising cooling liquid rises along said slope; and
    a steam conduit at each of said geodetically highest points for conducting away the rising cooling liquid from said structured bottom wall.

2. The container according to claim 1, wherein said bottom has an inner wall extending with an upward slope between a respective one of said geodetically lowest points and a respectively adjacent one of said geodetically highest points.

3. The container according to claim 1, which further comprises a top formed of a material of good thermal conductivity closing off the interior of the container.

4. The container according to claim 3, which further comprises a plurality of conduits passing through said top, and a differential-pressure-dependent shut-off element closing said conduits to a fluid flow.

5. The container according to claim 1, wherein said structured bottom wall is formed in a dome shape around a respective geodetically highest point.

6. The container according to claim 1, wherein said structured bottom wall is formed in a pyramid shape around a respective geodetically highest point.

7. The container according to claim 1, wherein said structured bottom wall has a wall with a thickness of between 1 cm and 10 cm.

8. The container according to claim 1, wherein said structured bottom wall is formed of a metal.

9. In a nuclear power plant of the type having a reactor pressure vessel disposed in a reactor cavity and enclosing a reactor core, and a container for collecting and spreading core melt escaping from the reactor cavity upon a meltdown accident, the container comprising a wall part and a bottom wall contiguous with said wall part, said bottom wall:
    being formed of a material of good thermal conductivity and with a plurality of geodetically lowest points, a plurality of geodetically highest points and substantially no horizontal segments between a respective one of said geodetically lowest points and a respectively adjacent one of said geodetically highest points, said bottom wall being surrounded by and in thermal contact with a cooling liquid, said bottom wall extending with an upward slope between a respective one of said geodetically lowest points and a respectively adjacent one of said geodetically highest points such that a rising cooling liquid rises along said slope;
    a steam conduit at each of said geodetically highest points for conducting away the rising cooling liquid from said bottom wall.

10. The nuclear power plant according to claim 9, wherein said container further comprises a top formed of a material of good thermal conductivity.

11. The nuclear power plant according to claim 10, which further comprises a supporting structure supporting said container, said container being fixed to said supporting structure so as to allow a relative movement thereof upon a change in temperature.

12. The nuclear power plant according to claim 9, wherein said container has a cross-sectional area of between 100 m² and 200 m².

13. A container for collecting and spreading core melt in a nuclear power plant, comprising:
   an interior;
   a structured bottom:
      formed of a thermal conductive material; and
      formed with a plurality of geodetically lowest points and
      a plurality of geodetically highest points;
   an outer wall extending with an upward slope between a respective one of said geodetically lowest points and a respectively adjacent one of said geodetically highest points;
   a top formed of a thermal conductive material closing off said interior; and
   a steam conduit extending through said interior and having an open top.

14. The container according to claim 13, wherein said bottom has an inner wall extending with an upward slope between a respective one of said geodetically lowest points and a respectively adjacent one of said geodetically highest points.

15. The container according to claim 13, which further comprises a plurality of conduits passing through said top, and a differential-pressure-dependent shut-off element closing said conduits to a fluid flow.

16. The container according to claim 13, wherein said bottom is formed in a dome shape around a respective geodetically highest point.

17. The container according to claim 13, wherein said bottom is formed in a pyramid shape around a respective geodetically highest point.

18. The container according to claim 13, wherein said, bottom has a wall with a thickness of between 1 cm and 10 cm.

19. The container according to claim 13, wherein said bottom is formed of a metal.

20. In a nuclear power plant of the type having a reactor pressure vessel disposed in a reactor cavity and enclosing a reactor core, and a container for collecting and spreading core melt escaping from the reactor cavity upon a meltdown accident, the container comprising a wall part and a bottom part contiguous with said wall part, said bottom part:
   being formed of a thermal conductive material; and
   being formed with a plurality of geodetically lowest points and a plurality of geodetically highest points; and
   including an outer wall extending with an upward slope between a respective one of said geodetically lowest points and a respectively adjacent one of said geodetically highest points, said outer wall being surrounded by a cooling liquid;
   a steam conduit-extending through said interior and having an open top.

21. The nuclear power plant according to claim 20, wherein said container further comprises a top formed of a thermal conductive material.

22. The nuclear power plant according to claim 20, which further comprises a supporting structure supporting said container, said container being fixed to said supporting structure so as to allow a relative movement thereof upon a change in temperature.

23. The nuclear power plant according to claim 20, wherein said container has a cross-sectional area of between 100 m² and 200 m².

* * * * *